(12) United States Patent
K C

(10) Patent No.: US 10,798,294 B1
(45) Date of Patent: Oct. 6, 2020

(54) REMOTELY CONTROLLING ACCESS TO A DIGITAL CAMERA

(71) Applicant: SYMANTEC CORPORATION, Mountain View, CA (US)

(72) Inventor: Santhanakrishnan K C, Chennai (IN)

(73) Assignee: NORTONLIFELOCK INC., Tempe, AZ (US)

(*) Notice: Subject to any disclaimer, the term of this patent is extended or adjusted under 35 U.S.C. 154(b) by 25 days.

(21) Appl. No.: 16/228,372

(22) Filed: Dec. 20, 2018

(51) Int. Cl.
| | |
|---|---|
| H04N 5/232 | (2006.01) |
| H04W 48/04 | (2009.01) |
| H04W 4/021 | (2018.01) |
| H04L 29/06 | (2006.01) |
| H04W 12/08 | (2009.01) |
| H04M 1/725 | (2006.01) |
| H04L 29/08 | (2006.01) |

(52) U.S. Cl.
CPC ....... *H04N 5/23218* (2018.08); *H04L 63/083* (2013.01); *H04M 1/72577* (2013.01); *H04N 5/23206* (2013.01); *H04W 4/021* (2013.01); *H04W 12/0804* (2019.01); *H04W 48/04* (2013.01); *H04L 67/125* (2013.01); *H04N 5/23219* (2013.01)

(58) Field of Classification Search
CPC .................................. H04N 5/23218
USPC ........................................... 725/105
See application file for complete search history.

(56) References Cited

U.S. PATENT DOCUMENTS

2016/0253508 A1* 9/2016 Song ............... G06F 21/554 726/29
2018/0213158 A1* 7/2018 Kim ............... G06F 3/04845

* cited by examiner

*Primary Examiner* — Joel W Fosselman
(74) *Attorney, Agent, or Firm* — Maschoff Brennan

(57) ABSTRACT

Remotely controlling access to a digital camera. In some embodiments, a method may include defining at least one parameter associated with a capture of media by a camera coupled to a monitored computer device, determining that the camera is capturing media, determining that the at least one parameter is present in the captured media; determining that the presence of the at least one parameter is not approved, and sending an instruction to the monitored computer device to disable use of the camera coupled to the monitored computer device for a pre-determined period of time based on determining that the presence of the at least one parameter is not approved.

20 Claims, 4 Drawing Sheets

REMOTELY CONTROLLING ACCESS TO A DIGITAL CAMERA

BACKGROUND

Today, smart devices such as smartphones are ubiquitous with not only adults, but also teenagers and younger children. Almost all smartphones in today's market have a camera, and almost all, if not all, smartphones have Internet and wireless communication capabilities. Thus, users of smartphones are able to take a myriad of photographs and/or videos, store them in memory, and/or share them across wireless communication channels, including uploading the photos to cloud services and web sites.

One problem with smartphones, however, is that users may take photographs and/or videos of people in situations, and in locations, without permission and/or that may be considered inappropriate or illegal. Furthermore, children having access to smartphone and smart devices may not know what is appropriate, what the laws are, and what is allowed or not allowed, or may be purposefully circumventing the rules, which may result in consequences. Existing solutions do not adequately address these problems.

SUMMARY

In some embodiments, a computer-implemented method for remotely controlling access to a digital camera may be at least partially performed by a monitoring computer device comprising one or more processors. The method may include defining, by the monitoring computer device, at least one parameter associated with a capture of media by a camera coupled to a monitored computer device, determining, by the monitoring computer device, that the camera is capturing media, determining, by the monitoring computer device, that the at least one parameter is present in the captured media, determining, by the monitoring computer device, that the presence of the at least one parameter is not approved, and sending, by the monitoring computer device, an instruction to the monitored computer device to disable use of the camera coupled to the monitored computer device for a pre-determined period of time based on determining that the presence of the at least one parameter is not approved.

In some embodiments, the method may include preventing storage of the captured media on a memory device associated with the monitored computer device.

In some embodiments, the method may include disabling access to a communication network based on determining that the presence of the at least one parameter is not approved.

In some embodiments, the method may include receiving, from the monitored computer device, a notification that at least one parameter is determined to be present in the captured media. Receiving the notification may further include receiving a copy of the captured media, indicating that the captured media is approved, and remotely enabling the camera based on indicating that the captured media is approved. The method may further include enabling storage of the captured media on a memory device associated with the monitored computer device.

In some embodiments, the defining the at least one parameter may include defining a location at which capturing media is not approved. In these embodiments, the method may further include determining a location of the monitored computer device at a time the camera is capturing media, and remotely disabling use of the camera based on determining the location of the monitored computer device is the same as the location at which capturing media is not approved.

In some embodiments, the method may further include determining that the presence of the at least one parameter that is not approved meets an exception, and overriding the disabling of the use of the camera based on meeting the exception. In this embodiment, overriding the disabling may further include sending an exception password to the monitored computer device.

In some embodiments, determining that the camera is capturing media may further include determining that the camera is capturing a photograph, a video, or a streaming video.

In some embodiments, defining the at least one parameter may include identifying, in the captured media, an unauthorized person, a body part, a pre-determined amount of bare skin, a location, a time, or a combination thereof.

In some embodiments, the method may further include obtaining, from the monitored computer device, audio obtained by the monitored computer device, associating the obtained audio with the captured media, and determining the captured media is not allowed based on the association of the obtained audio with the captured media.

In some embodiments, defining the at least one parameter may further include providing to the monitored computer device images of authorized persons, biometric information of authorized persons, images of body parts, or a combination thereof.

In some embodiments, the method may further include receiving permission, from the monitored computer device, to control access to the camera by the monitored computer device.

In some embodiments, a computer-implemented method for remotely controlling access to a digital camera may be at least partially performed by a monitored computer device including one or more processors. The method may include providing permission, to a monitoring computer device, to control access to a camera associated with the monitored computer device, obtaining, from the monitoring computer device, at least one parameter associated with the capture of media by the camera, where a presence of the at least one parameter in the captured media is not allowed, capturing media from the camera, receiving a first instruction to disable the camera based on capturing media and based on the monitoring computer device determining the presence of the at least one parameter, and disabling the camera.

In some embodiments, the method may further include receiving a second instruction to prevent storage of the captured media on a memory device associating with the monitored computer device.

In some embodiments, the method may further include sending, to the monitoring computer device, the captured media, receiving, from the monitoring computer device, an indication the captured media is allowed, enabling the camera, and storing, in memory associated with the monitored computer device, the captured media.

In some embodiments, the method may include receiving a third instruction to disable access to a communication network. In these embodiments, in response to receiving the third instruction, the method may further include disabling access to the communication network after sending the captured media to the monitoring computer device.

In some embodiments, a computer device may include a processor, a memory in electronic communication with the processor, and instructions stored in the memory, with the instructions being executable by the processor to perform a method for remotely controlling access to a digital camera.

In some embodiments, one or more non-transitory computer-readable media may include one or more computer-readable instructions that, when executed by one or more computing devices, cause the one or more computing devices to perform the method for remotely controlling access to a digital camera.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

With the ease of which photographs and other media may be obtained in today's world, there is also the potential of taking photographs, videos, and live streams of people, locations, and situations that are inappropriate, not consensual, unacceptable, illegal, or otherwise frowned upon. Many countries, businesses, and locations have laws and rules against taking inappropriate photographs or videos without permission, and/or laws and rules against sharing media with third parties (such as by uploading media to the Internet) without permission. Such actions may be considered privacy violations and may be subject to regulatory and/or legal action. For example, laws may prohibit the photography or videotaping of individuals in locations where people have an expectation of privacy, such as a gym, a tanning salon, a locker room, a dressing room, and the like. Furthermore, laws may prohibit the photography and videotaping of people or body parts secretly or without permission.

In some cases, children may have access to a camera on a computing device, such as a smartphone, and may not know the rules or laws, or may not appreciate the consequences of taking unauthorized photographs and videos. Thus, parents may want the ability to remotely disable the child's smartphone camera, or enable other actions, such as receiving notifications, receiving the photograph or video taken, disabling the storing of the photograph or video in memory, disabling uploading of the photograph or video to the Internet, to the cloud, etc. In some cases, the parent may be given the opportunity to review the photography or video and approve the capture.

In still other cases, photography or videotaping may not be allowed in movie theaters, in government buildings, during certain situations, confidential meetings, etc. Thus, employees, visitors, and other users of a camera may be prevented from taking photographs or videos in prohibited locations and situations or of prohibited individuals. In such cases, an administrator such as a government official, employer, or other agent may be responsible for remotely controlling access of the camera.

Figure 1:
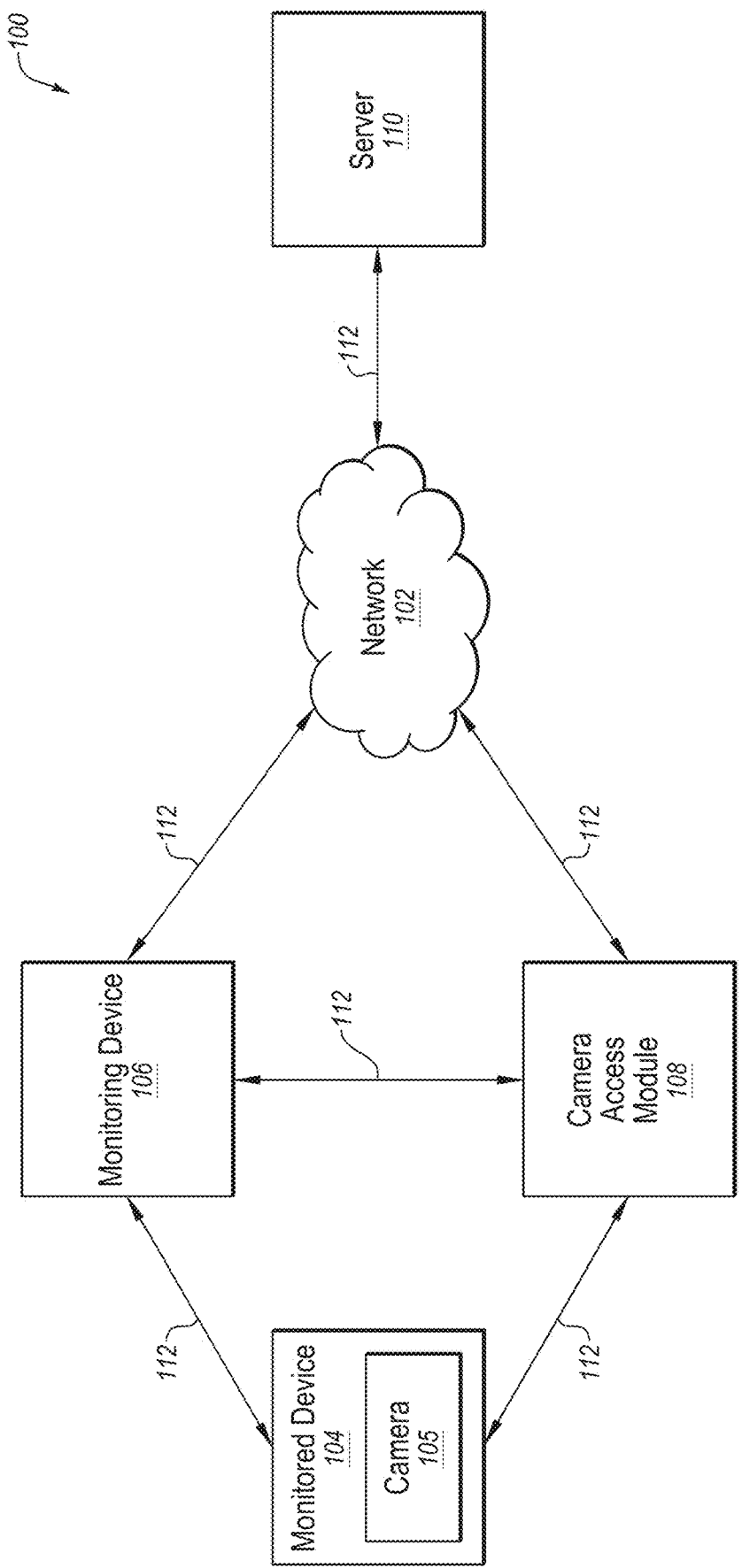
FIG. 1 illustrates an example system configured for remotely controlling access to a digital camera.

Turning to the figures, FIG. 1 illustrates an example system 100 configured for remotely controlling access to a digital camera. The system 100 may include a network 102, a monitored device 104, a monitoring device 106, a server 110, and a camera access module 108. In some embodiments, monitored device 104 and monitoring device 106 may also be referred to as a client device. In some embodiments, camera access module 108 may execute on a standalone device that communicates with the monitored device 104, monitoring device 106, and the server 110. In other embodiments, however, the camera access module 108 may be part of the monitored device 104, the monitoring device 106, and/or the server 110.

In some embodiments, the network 102 may be configured to communicatively couple the monitored device 104, the monitoring device 106, the server 110, and in some embodiments, the camera access module 108. In some embodiments, the network 102 may be any wired or wireless network, or combination of multiple networks, configured to send and receive communications between systems and devices by way of example communication links 112. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoW) network. Furthermore, in some embodiments, the monitored device 104 and monitoring device 106 may communicate using peer-to-peer (P2P) communications, Near-field communication (NFC), short-range communications such as BLUETOOTH® and/or BLUETOOTH LOW ENERGY (BLE) communications, and the like.

Figure 4:
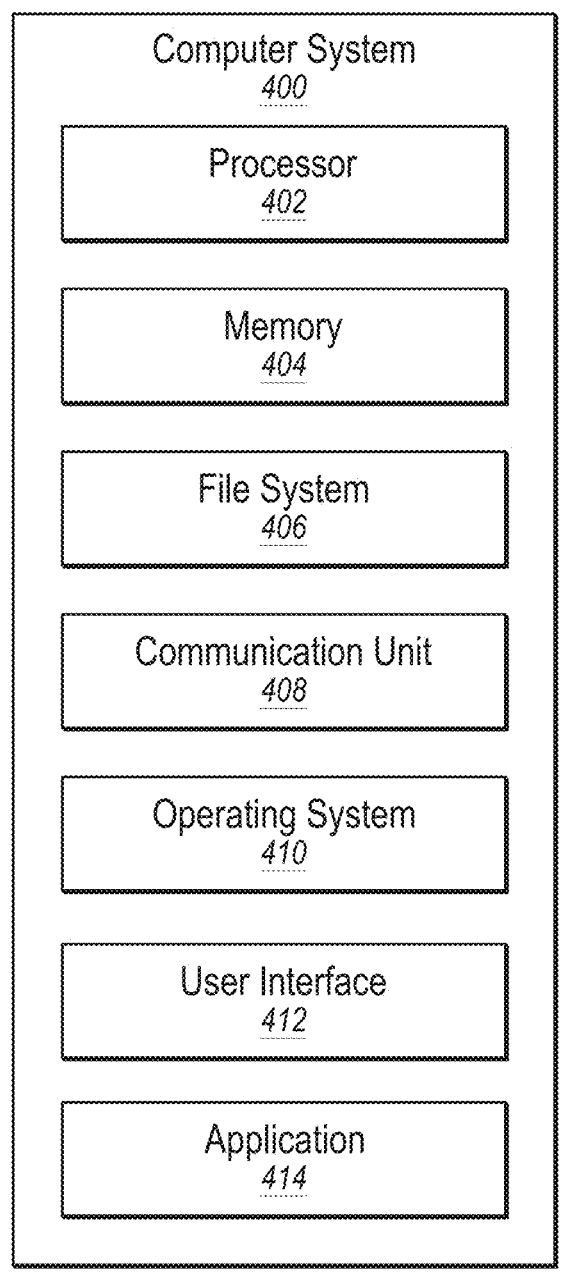
FIG. 4 illustrates an example computer system that may be employed in remotely controlling access to a digital camera.

In some embodiments, the monitored device 104 and monitoring device 106 may be computer systems capable of communicating over the network 102 and capable of, at least, remotely controlling access to a digital camera 105 and receiving instructions from another device regarding remote access to the digital camera 105, examples of which are disclosed herein in connection with the computer system 400 of FIG. 4.

In some embodiments, the monitored device 104 may be a computer device, such as a smartphone, that is under the control of a monitored user such as a child, an employee, or a visitor to a location. In some embodiments, the monitored user may have access to some, but not all, access to software applications and processes associated with the monitored device 104. In some embodiments, the monitoring device 106 may be a computer device, such as a smartphone, desktop computer, laptop computer, control system, tablet, etc., that is under the control of a monitoring user such as a parent or guardian, an employer, an owner of a business, an administrator, or another party that has at least some control over the actions of the user of the monitored device 104.

Similarly, in some embodiments, the server 110 may be any computer system capable of communicating over the network 102 and capable of facilitating remotely controlled access to a digital camera, examples of which are disclosed herein in connection with the computer system 400 of FIG. 4.

Although the system and methods may be used in any situational context, for purposes of clarity and brevity, the system and methods will be described in the context of a parent or guardian and a minor. As previously discussed, the use of mobile computing devices is ubiquitous, not only with adults, but also with children. Children may have use of a smartphone, a tablet, a smart television, a personal computing device such as a laptop or a desktop or other device which enables the child to communicate with and share information and media with parents, peers, teachers, and others. Communication may be by way of, but not limited to, texting, uploading media such as pictures and videos, live streaming, social media, proximity sharing, and the like. Children may share text, web links, documents, e-mails, screenshots, etc., but a child may also take photographs, videos, or participate in live streaming, and share such media with others.

In some cases, the child may take a photograph, take a video, or participate in a live streaming event that could be deemed inappropriate, unwanted, or illegal. Instead of dealing with the consequences after the fact, a parent or guardian my use a software application on the child's device that works to mitigate potential future issues.

Both the monitored device 104 and the monitoring device 106 may, respectively, obtain a software application to remotely control access to a digital camera 105 associated with the monitored device 104 (e.g., a smartphone camera). The software application may be associated with or executed by camera access module 108. In situations where photographs or videography are not permitted on the basis of location or situation, for example, a movie theater, a government building, a meeting, etc., the user of the monitored device 104 may be required to download the software application as a condition of admittance or participation. In some cases, whether it be parent-child monitoring, or other monitoring, the camera access module 108 may be overridden, or exceptions may be made, if the user of the monitored device 104 enters a passcode provided by the user of the monitoring device 106. In an additional or alternative embodiment, the monitoring device 106 may send a communication to the monitored device 104 to automatically provide the exception or override.

With regard to the monitoring device 106, the camera access module 108 may enable the parent or guardian to remotely control access to the camera 105 of monitored device 104. In one embodiment, the parent or guardian can establish a "white list" and a "black list" of media that is allowed or not allowed, respectively, to be obtained and manipulated by the monitored device 104, If the camera access module 108 determines that the media taken by the monitored device 104 falls into the "white list" category, the camera access module 108 may do nothing further with respect to the monitoring device 106. However, if the camera access module 108 determines that the media taken by the monitored device 104 falls into the "black list" category, then the camera access module 108 may do one or more of a few remedial actions, including, automatically disabling the camera 105 on the monitored device 104, sending a notification to the monitoring device 106 or another device associated with the parent or guardian, sending the media determined to be part of the black list to the monitoring device 106 (or another device associated with the parent or guardian), disabling the storage of the media on memory internal to monitored device 104, disabling transmittal of the media over network 102 or over another communication means, and thus disabling the ability to store the media on a remote computer device or in the cloud, etc.

In some embodiments, the "white list" may be pre-established (e.g., default) by software application manufacturers. In some embodiments, the "white list" may be personalized by the parent or guardian and, in some cases, the child. In other embodiments, the "white list" may be pre-established by law, by school rules, by location rules (e.g., a theater), by time, by situation, by date, or by other parameters which may establish a list of media (e.g., text, visual, audio, etc.) that is acceptable and that will not invoke remedial action by the camera access module 108.

The "white list" may be established and/or altered by an administrator (e.g., parent) of the monitoring device 106 by interacting with the software application. For example, the software application may present interactive options to the administrator on a graphical user interface on a computer device display. For example, the "white list" may establish that photographs taken of family members and friends is acceptable by default. Media associated with "white list" people may be uploaded to the software application and features of the "white list" people may be learned by the camera access module 108 so that media obtained by the camera 105 of the monitored device 104 may be matched to the "white list" people and indicated as approved. Other biometric information may be determined and analyzed such as, but not limited to, voice, gait, physical stature, the color of skin, the color of hair, the color of eyes, the shape of various anatomy, unique identifying physical features, etc. In some cases, identifying features may be specific to specific individuals, or the identifying features may be generic, and may be analyzed and matched as being within a margin of error to determine it is more likely than not that a person or situation is identified.

In some embodiments, people may be on the "white list" all of the time, whereas in other cases, people may be on the "white list" if certain conditions are met. For example, a child may take a photograph of a friend on the "white list," if it is also established that the monitored device 104 is determined to be located in a public place, such as a swimming pool or park, or in school. However, it may not be appropriate for a child to take a photograph or a video of a friend that is otherwise on the "white list" if the monitored device 104 is determined to be located in a private place, such as a bedroom, a bathroom, a dressing room, a spa, a gym, and other places where there may be an increased expectation of privacy. In some embodiments, "white list" locations may be established by way of creating a geo-fence, or by using other geo-location techniques. Determining the location of the monitored device 104 may be done using known geo-location techniques.

In another embodiment, the time of day that the camera 105 of the monitored device obtains media may be at issue, even if a person is on the "white list." For example, photographs and videos taken during regular waking hours, such as 7:00 a.m. through 10:00 p.m., may more likely be "allowed," whereas photographs taken even of "white list" people at 3:00 a.m. may be more inappropriate. Thus, a list of people may be on the "white list," but each person or a group of people may be associated with additional conditions that must be met to keep each respective person on the white list in certain situations.

Other "white list" objects may include, but are not limited to, building facades, scenery, and situations such as public parades, protests, sporting events, etc.

The parent or guardian may thus establish not only a list of people (with associated identifying features), but may also establish default physical features. In addition, the parent or guardian may establish time frames and locations where media obtained by the camera 105 on the monitored device 104 is allowed versus not allowed.

In the alternative, a "black list" may be established. In some embodiments, the "black list" may be pre-established (e.g., default) by the software application manufacturers. In some embodiments, the "black list" may be personalized by the parent or guardian. In other embodiments, the "black list" may be pre-established by law, by school rules, by location rules (e.g., a theater), by time, by situation, by date, or by other parameters which may establish a list of media (e.g., text, visual, audio, etc.) that is not allowed or considered to be unethical and that will invoke remedial action by the camera access module 108.

The "black list" may be established and/or altered by an administrator (e.g., parent) of the monitoring device 106 by interacting with the software application. For example, the software application may present interactive options to the administrator on a graphical user interface on a computer device display. For example, the "black list" may establish that photographs taken of unknown individuals is unacceptable by default. Photographs, videos, and other identifying elements associated with the "black list" may be uploaded or otherwise described to the software application, and features of individuals on the "black list" may be learned by the camera access module 108. For example, a pre-determined percentage of bare skin that exceeds a threshold known by the camera access module 108 may be a "black list" element. Similarly, body parts that would be considered private may be "black list" elements. Additionally, camera access module 108 may identify when a user of the monitored device 104 zooms in on specific elements of an intended photograph or video, such as a person not identified as known, zooming in on specific body parts, and the like. If the photography, video, or streaming is determined to be unacceptable by the camera access module 108, the camera access module 108 may take an action, described in more detail below.

As with the white list, an element, individual, location, situation, etc. may be identified as being on the "black list," but may be subject to an exception that would not cause the camera access module 108 to take an action. For example, if a child has control over a monitored device 104 and is taking photographs at a school sponsored swim meet, the photographs may be initially determined to be unacceptable or not allowed; however, the camera access module 108 may determine that multiple recognized and "white list" people are present in the photograph, and the location is a location on the white list. Thus, in one embodiment, the camera access module 108 may make a determination not to take an action, or may take a less serious action, such as sending an alert to the parent. In another embodiment, the camera access module 108 may send the photograph to the parent and request an override based on the situation.

In some embodiments, the photograph or video itself may appear innocuous, but a microphone associated with the camera 105 on the monitored device 104 may obtain audio that indicates that the photograph or video is taken with unethical intent. In such a case, the camera access module 108 may take an action.

In one embodiment, the user associated with the monitored device 104 may obtain the software application for remotely controlling the camera 105 of the monitored device 104. In one embodiment, the application may be pre-installed on the monitored device 104. In an additional or alternative embodiment, the user may obtain the software application from an app store, and may download the application to the monitored device 104. Once the application is on the monitored device 104, a user associated with the monitoring device 106 may establish rules for access of the camera 105 by the monitored device 104. Thus, once the user attempts to take a photograph, take a video, begin a live stream, or zoom in or out on portions of the image, the camera access module 108 may obtain the media (either completed or in progress of capture) and determine, based on the rules and other situational elements, whether the media violates or likely violates a rule as described above.

If the monitored device 104 is in the progress of capturing, or captures, a photograph or video that appears benign, the camera access module 108 may take no further action. In another embodiment, the camera access module 108 may analyze the photograph or video to aid in future determinations.

In contrast, if the monitored device 104 is in the progress of capturing, or captures, a photograph or video that appears to be unapproved, unethical, illegal, etc., the camera access module 108 may take an action. In one embodiment, the camera access module 108 may disable further use of the camera 105. Disabling the camera 105 may take the form of preventing storage of the photograph or video in memory (local or remote). Disabling the camera 105 may take the form of prohibiting the user of the monitored device 104 from accessing a camera application on the device.

In an additional or alternative embodiment, the camera access module 108 may disable access to the network 102 so that the photograph or video cannot be uploaded to the Internet or otherwise shared to other devices, to the cloud, to other people, etc. In some embodiments, access to the network 102 may be disabled in conjunction with disabling the camera 105, and both or either of the camera 105 and network access may be disabled until a parent (or user of the monitoring device 106) can review the photograph or video and override the disablement.

In an additional or alternative embodiment, the camera access module 108 may transmit a notification to the parent (e.g., user of the monitoring device 106). In one embodiment, the notification may provide an indication that a photograph or video has been taken that merits review. Such a notification may include identifying information such as a time stamp and/or a geotag, as well as the photograph in question, a clip of the video, access to the live stream, etc.

In an additional or alternative embodiment, the camera access module 108 may prevent storage of the photograph or video in local memory on the monitored device 104, and instead may transmit all or some of the photographs or videos taken by the monitored device 104 to memory of the monitoring device 106 or to cloud storage associated with the user of the monitoring device 106. In such a case, the parent or user of the monitoring device 106 may approve or deny storage of some or all of the photographs of videos. If the photograph or video is approved, the photograph or video may be transmitted to the monitored device 104 for local storage on the monitored device 104. Similarly, if the photograph or video is approved, the photograph or video may be stored on a cloud service, and access to the photograph or video may be granted to the user of the monitored device 104.

If the camera access module 108 obtains information that the camera 105 on the monitored device 104 should not be accessed because of location, time, situation, etc., then the camera access module 108 may disable access to the camera 105 or storage of the media until the monitored device 104 is no longer in the location or situation, or the time has passed, in which the camera 105 should not be accessed. In some embodiments, the monitored device 104 may be allowed to use the camera 105 despite a default restriction, and the monitored device 104 may receive a passcode to override the camera access module 108. In another embodiment, another computer system may send an override communication to the monitored device 104.

Figure 2:
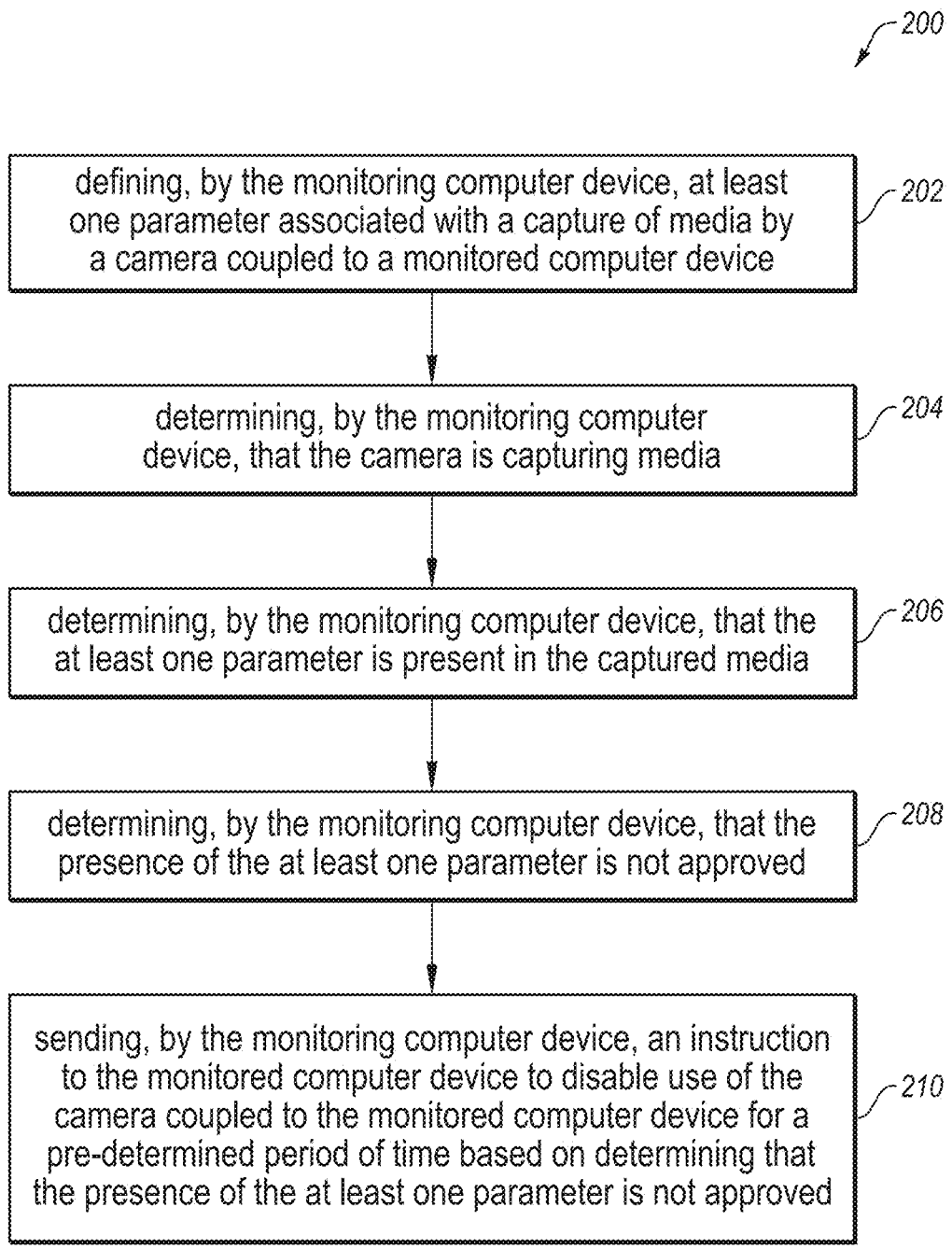
FIG. 2 illustrates a flowchart of an example method for remotely controlling access to a digital camera.

FIG. 2 illustrates a flowchart of an example method 200 for remotely controlling access to a digital camera. The method 200 may be performed, in some embodiments, by a device or system, such as by monitored device 104, monitoring device 106, server 110, and/or camera access module 108 operating independently, or operating on, one of the other described devices. In these and other embodiments, the method 200 may be performed by one or more processors based on one or more computer-readable instructions stored on one or more non-transitory computer-readable media. The method 200 will now be described in connection with FIGS. 1 and 2.

Method 200 may include, at action 202, defining, by the monitoring computer device, at least one parameter associated with a capture of media by a camera coupled to a monitored computer device. For example, the parents may define a set of allowed and not allowed parameters that a child may or may not capture on the monitoring device 104. In an additional or alternative embodiment, the parameters may be sent to, or established on, the monitoring device 106, or on another computing system. The set of allowed parameters may include known people, known locations, benign subject matter (trees, parks, buildings, etc.). The set of not allowed parameters may include unknown people, naked photos, photos of not allowed body parts, prohibited locations, etc.

Method 200 may include, at action 204, determining, by the monitoring computer device, that the camera is capturing media. For example, the monitoring device 106 may receive a notification that the monitored device 104 has activated a camera application on the monitored device 104, or that a picture, video, live stream, etc. is in the process of or has been captured.

Method 200 may include, at action 206, determining, by the monitoring computer device, that the at least one parameter is present in the captured media. For example, the monitoring device 106 may analyze the media captured compared to the set of parameters established in action 202 to determine whether one of the established parameters is present. In an additional or alternative embodiment, the monitored device 104 may analyze the media and send an indication of the analysis to the monitoring device 106.

Method 200 may include, at action 208, determining, by the monitoring computer device, that the presence of the at least one parameter is not approved. For example, the monitoring device 106 may determine that the media has captured at least one of the not allowed parameters established at action 204, such as a naked photo of a unknown person, or a photograph that contains more skin surface of an approved person than has been previously approved.

Method 200 may include, at action 210, sending, by the monitoring computer device, an instruction to the monitored device to disable use of the camera 105 coupled to the monitored device for a pre-determined period of time based on determining that the presence of the at least one parameter is not approved. For example, the monitoring device 106 may instruct the monitored device 104 to disable the camera 105. In one embodiment, the user of the monitored device 104 may not be able to access a camera application on the monitored device 104. In an additional or alternative embodiment, the user may be able to access the camera 105, but a shutter of the camera 105 may not be active.

Although the actions of the method 200 are illustrated in FIG. 2 as discrete actions, various actions may be divided into additional actions, combined into fewer actions, reordered, expanded, or eliminated, depending on the desired implementation.

Figure 3:
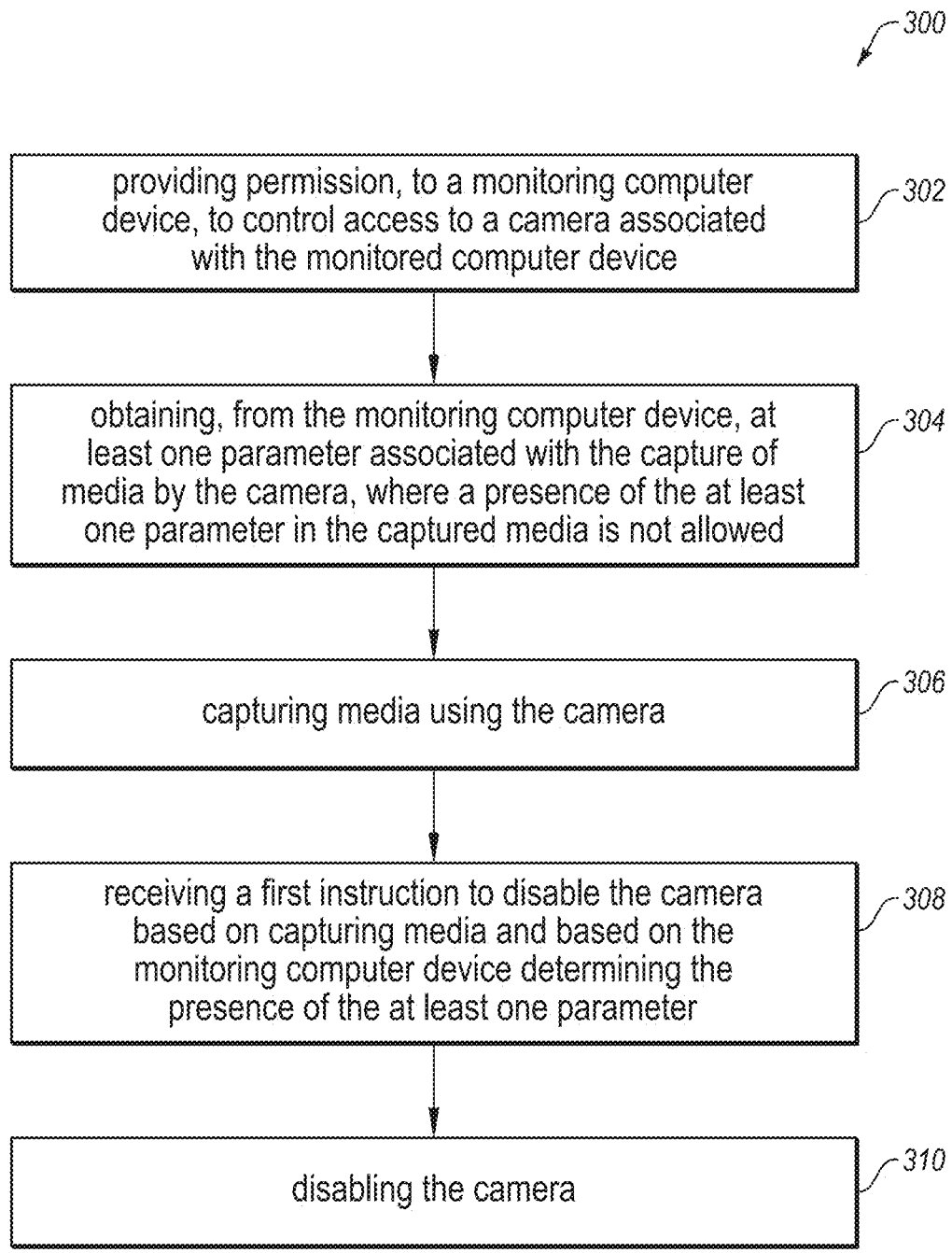
FIG. 3 illustrates a flowchart of an example method for remotely controlling access to a digital camera.

FIG. 3 illustrates a flowchart of an example method for remotely controlling access to a digital camera. The method 300 may be performed, in some embodiments, by a device or system, such as by monitored device 104, monitoring device 106, server 110, and/or camera access module 108 operating independently or on one of the other described devices. In these and other embodiments, the method 300 may be performed by one or more processors based on one or more computer-readable instructions stored on one or more non-transitory computer-readable media. The method 300 will now be described in connection with FIGS. 1 and 3.

Method 300 may include, at action 302, providing permission, to a monitoring computer device, to control access to a camera associated with the monitored computer device. For example, both the monitoring device 106 and the monitored device 104 may obtain a software application to enable the monitoring device 106 to remote control access to the camera 105 of the monitored device 104. The monitored device 104 may give the monitoring device 106 permission to access to the camera 105 through the software application.

Method 300 may include, at action 304, obtaining, from the monitoring computer device, at least one parameter associated with the capture of media by the camera, where a presence of the at least one parameter in the captured media is not allowed. For example, the monitored device 104 may receive an indication of at least one parameter that is not allowed, such as photographs of approved people, audio files, descriptions, photographs of body parts, etc.

Method 300 may include, at action 306, capturing media using the camera. For example, the monitored device 104 may enable the camera application on a smartphone, and begin to take or take a photograph, a video, or begin streaming a video using the camera 105.

Method 300 may include, at action 308, receiving a first instruction to disable the camera based on capturing media and based on the monitoring device determining the presence of the at least one parameter. For example, the monitoring device 106 may have received a notification that media was captured that included a parameter that was not allowed or the monitoring device 106 may have determined the media include a parameter that was not allowed.

Method 300 may include, at action 310, disabling the camera. Based on the determination and/or instruction from action 208, the software application downloaded by the monitored device 104 may deactivate access to or use of the camera 105 on the monitored device 104.

Although the actions of the method 300 are illustrated in FIG. 3 as discrete actions, various actions may be divided into additional actions, combined into fewer actions, reordered, expanded, or eliminated, depending on the desired implementation. Further, it is understood that the method 300 may improve the functioning of a computer system itself. For example, the functioning of the abnormal behavior module 108 may improve the field of malware detection, which in turn may improve the functioning of a computer network and computer applications. Furthermore, the embodiments described here improves the use of the way a computer system works by determining abnormal behavior indicative of security threat at an early stage which enables early mitigated actions or responses.

FIG. 4 illustrates an example computer system 400 that may be employed in identifying and protecting against a computer security threat utilizing decision tree models with order-preserving encoded data. In some embodiments, the computer system 400 may be part of any of the systems or devices described in this disclosure. For example, the computer system 400 may be part of the monitored device 104, monitoring device 106, server 110, and/or the camera access module 108 of FIG. 1.

The computer system 400 may include a processor 402, a memory 404, a file system 406, a communication unit 408, an operating system 410, a user interface 412, and a module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the methods 200 and 300 of FIGS. 2 and 3, respectively.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the methods 200 and 300 of FIGS. 2 and 3, respectively. These computer-executable instructions may be included, for example, in the operating system 410, in one or more applications, such as camera access module 108, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, a 402.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The module 414 may be one or more computer-readable instructions stored on one or more non-transitory computer-readable media, such as the memory 404 or the file system 406, that, when executed by the processor 402, is configured to perform one or more of the actions of the methods 200 and 300 of FIGS. 2 and 3, respectively. In some embodiments, the module 414 may be part of the operating system 410 or may be part of an application of the computer system 400, or may be some combination thereof. In some embodiments, the module 414 may function as the camera access module 108 of FIG. 1.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for remotely controlling access to a digital camera, at least a portion of the method being performed by a monitoring computer device comprising one or more processors, the method comprising:
   defining, by the monitoring computer device, at least one parameter associated with a capture of media by the digital camera coupled to a monitored computer device;
   receiving, at the monitoring computer device, permission from the monitored computer device to control access to the digital camera;
   determining, by the monitoring computer device, that the digital camera is capturing media;
   determining, by the monitoring computer device, that the at least one parameter is present in the captured media;
   determining, by the monitoring computer device, that the presence of the at least one parameter is not approved; and
   sending, from the monitoring computer device, an instruction to the monitored computer device to disable use of the digital camera coupled to the monitored computer device for a pre-determined period of time based on determining that the presence of the at least one parameter is not approved.

2. The method of claim 1, further comprising:
   preventing storage of the captured media on a memory device associated with the monitored computer device.

3. The method of claim 1, further comprising:
   disabling access to a communication network based on determining that the presence of the at least one parameter is not approved.

4. The method of claim 1, further comprising:
   receiving, from the monitored computer device, a notification that the at least one parameter is determined to be present in the captured media.

5. The method of claim 4, wherein receiving the notification further comprises:
   receiving a copy of the captured media;
   indicating that the captured media is approved; and
   remotely enabling the digital camera based on indicating that the captured media is approved.

6. The method of claim 5, further comprising:
   enabling storage of the captured media on a memory device associated with the monitored computer device.

7. The method of claim 1, wherein:
defining the at least one parameter includes defining a location at which capturing media is not approved;
the method further comprises determining a location of the monitored computer device at a time the digital camera is capturing media; and
the method further comprises remotely disabling use of the digital camera based on determining the location of the monitored computer device is the same as the location at which capturing media is not approved.

8. The method of claim 1, further comprising:
determining that the presence of the at least one parameter that is not approved meets an exception; and
overriding the disabling of the use of the digital camera based on meeting the exception.

9. The method of claim 8, wherein overriding the disabling further comprises:
sending an exception password to the monitored computer device.

10. The method of claim 1, wherein determining that the digital camera is capturing media further comprises:
determining that the digital camera is capturing a photograph, a video, or a streaming video.

11. The method of claim 1, wherein defining the at least one parameter includes identifying, in the captured media, an unauthorized person, a body part, a pre-determined amount of bare skin, a location, a time, or a combination thereof.

12. The method of claim 1, further comprising:
obtaining, from the monitored computer device, audio obtained by the monitored computer device;
associating the obtained audio with the captured media; and
determining the captured media is not allowed based on the association of the obtained audio with the captured media.

13. The method of claim 1, wherein defining the at least one parameter includes:
providing, to the monitored computer device, images of authorized persons, biometric information of authorized persons, images of body parts, or a combination thereof.

14. The method of claim 1, wherein:
the monitored computer device comprises a smartphone; and
the digital camera is on the smartphone.

15. A computer-implemented method for remotely controlling access to a digital camera, at least a portion of the method being performed by a monitored computer device comprising one or more processors, the method comprising:
providing permission, to a monitoring computer device, to control access to the digital camera associated with the monitored computer device;
obtaining, from the monitoring computer device, at least one parameter associated with a capture of media by the digital camera, where a presence of the at least one parameter in the captured media is not allowed;
capturing media using the digital camera;
receiving a first instruction to disable the digital camera based on capturing media and based on the monitoring computer device determining the presence of the at least one parameter; and
disabling the digital camera.

16. The method of claim 15, further comprising:
receiving a second instruction to prevent storage of the captured media on a memory device associating with the monitored computer device.

17. The method of claim 16, further comprising:
sending, to the monitoring computer device, the captured media;
receiving, from the monitoring computer device, an indication the captured media is allowed;
enabling the digital camera; and
storing, in memory associated with the monitored computer device, the captured media.

18. The method of claim 15, further comprising:
receiving a third instruction to disable access to a communication network.

19. The method of claim 18, further comprising:
disabling access to the communication network after sending the captured media to the monitoring computer device.

20. A monitoring computing device for remotely controlling access to a digital camera, comprising:
a processor;
a memory in electronic communication with the processor; and
instructions stored in the memory, the instructions being executable by the processor to:
define at least one parameter associated with a capture of media by the digital camera coupled to a monitored computer device;
receive permission from the monitored computer device to control access to the digital camera;
determine that the digital camera is capturing media;
determine that the at least one parameter is present in the captured media;
determine that the presence of the at least one parameter is not approved; and
send an instruction to the monitored computer device to disable use of the digital camera coupled to the monitored computer device for a pre-determined period of time based on determining that the presence of the at least one parameter is not approved.

* * * * *